United States Patent [19]

Remmers et al.

[11] Patent Number: 4,474,138
[45] Date of Patent: Oct. 2, 1984

[54] METHOD AND APPARATUS FOR COOLING HOT BULK MATERIAL

[75] Inventors: Karl Remmers, Düsseldorf; Heinz Steinebach, Bottrop, both of Fed. Rep. of Germany

[73] Assignee: Thyssen Industrie AG, Fed. Rep. of Germany

[21] Appl. No.: 402,126

[22] Filed: Jul. 26, 1982

[30] Foreign Application Priority Data

Aug. 1, 1981 [DE] Fed. Rep. of Germany ....... 3130582

[51] Int. Cl.³ ............................................... F22D 1/00
[52] U.S. Cl. ............................... 122/7 R; 165/104.15; 165/104.18
[58] Field of Search ................... 122/7 R; 165/104.15, 165/104.16, 104.18

[56] References Cited

U.S. PATENT DOCUMENTS

| | | | |
|---|---|---|---|
| 3,546,787 | 12/1970 | Horner et al. | 165/104.18 |
| 4,351,275 | 9/1982 | Bhojwani | 122/7 R |
| 4,369,834 | 1/1983 | Meunier et al. | 122/7 R X |

FOREIGN PATENT DOCUMENTS

| | | |
|---|---|---|
| 492943 | 3/1930 | Fed. Rep. of Germany . |
| 2435500 | 2/1976 | Fed. Rep. of Germany . |
| 2501328 | 7/1976 | Fed. Rep. of Germany . |
| 2952065 | 7/1981 | Fed. Rep. of Germany . |

*Primary Examiner*—Edward G. Favors
*Attorney, Agent, or Firm*—McGlew and Tuttle

[57] ABSTRACT

A method of cooling hot bulk material using a reactor comprises passing a cooling gas in heat exchange relationship with the bulk material, contacting the cooling gas and the bulk material with a water vaporizing heat exchanger surface to remove a part of the heat content of the bulk material and the cooling gases which are heated by the bulk material, and directing the cooling gases after the contact, to an additional water vaporizing heat exchange surface to cool the contacted gases for reuse. The cooling gases after they are heated are directed preferably to a waste heat boiler where they are cooled and after separation returned back to be again circulated to the reacting vessel for cooling the bulk material. The cooling reactor for cooling the hot bulk material comprises a vertically elongated vessel defining a cooling chamber which has a top charging inlet for the bulk material and a bottom charge discharge for the cooled bulk material. The construction includes a plurality of water vaporizing heat exchanger surfaces in the reactor vessel which, for example may comprise elements embedded in the wall of the reactor vessel for circulating water from a ring pipe inlet to a steam ring pipe discharge located adjacent the upper end of the reactor vessel. Additionally heat exchanger units may extend across the reactor vessel. The top of the units are covered by roof-like elements to deflect the bulk material away from the units and from a central empty space defined by the units.

21 Claims, 6 Drawing Figures

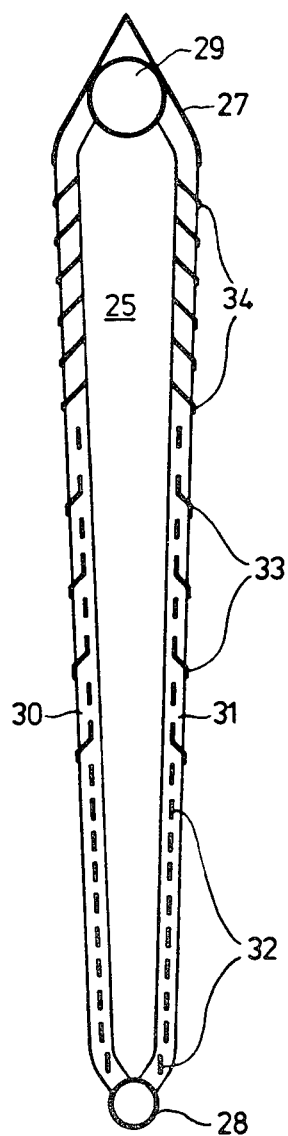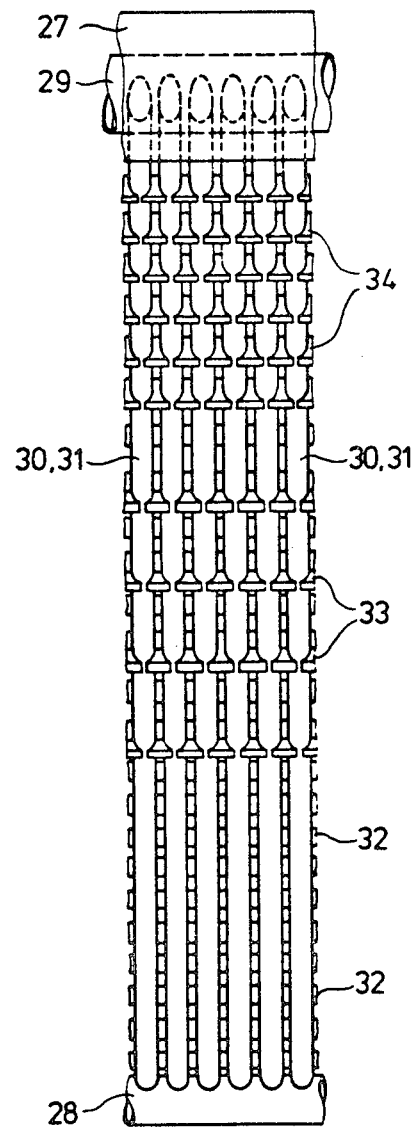
Fig. 5
Fig. 6

METHOD AND APPARATUS FOR COOLING HOT BULK MATERIAL

FIELD AND BACKGROUND OF THE INVENTION

This invention relates in general to coking and in particular to a new and useful method and apparatus for cooling bulk material such as coke.

In prior art dry coke cooling plants (for example according to German AS No. 10 71657), the hot coke produced in a coke oven battery is cooled by directing an inert cooling gas through the hot coke layer. It is further known (from Swiss Pat. No. 101,570) to circulate the cooling gas and re-cool it in a heat exchanger which is designed as a boiler. In addition, a blower for circulating the cooling gas, and a preliminary dust separator and a fine dust separator are provided in the cooling gas circuit.

To obtain the desired steam production in the waste heat boiler and then a uniform generation of energy, a continuous operation of the coke cooling chambers is needed, i.e. only small variation in the heat amount removed from, and in the temperature of, the hot coke in the cooling chamber can be tolerated. This requires special measures.

According to German AS No. 26 18 654, variations in the heat amount delivery caused by the intermittent bulk material supply are compensated for, and the plant conduits, particularly the boiler tubes, are prevented from overheating by branching off a controllable partial stream of the cooling gas before it enters the vertical chamber, and reuniting it with the heated cooling gas stream ahead of the entrance into the re-cooling heat exchanger. The equipment for carrying out the method comprises a bypass which is parallel to the cooling chamber and in which the partial stream of cooling gas is branched off after the circulating blower and is directed through a mixer for controlling the inlet temperature of the hot cooling gas, into the heat exchanger. In the head zone of the cooling chamber, the hot cooling gas is taken off about at the level of the outlet of the charging lock. By directing a variable amount of gas into the cooling chamber and introducing the balance through the bypass into the outlet line for the hot cooling gas, conditions are to be created for keeping the temperature of the cooling gas at the entrance into the recooling heat exchanger at about 550° C. to 650° C. It must be taken into account in this connection that only a partial gas stream is available for cooling the charged bulk material, while the gas recycling equipment, particularly the recooling heat exchanger, the dust separator, the circulation blower, and the gas lines must be dimensioned for the entire gas amount.

In another method, disclosed in German Pat. No. 1,471,589, to obtain a sufficiently uniform rate of heat removal from the hot coke, a cooling chamber of refractory masonry with two operating zones is provided and the hot coke is kept ready in the antechamber section through which the cooling gas does not pass, and is cooled only after sinking into the lower section of the cooling chamber, by a countercurrently flowing gas stream, to the discharge lock exit temperature. The antechamber section is effective as a heat bank and temperature buffer. What is disadvantageous is that the large volume cooling chamber has a very complicated structure. An inner abrasion layer of refractory material is followed by layers of thermal insulation and backfilling inside a steel shell. In the interior of the masonry, passages and a ring conduit for evacuating the hot cooling gas are provided. This results in high capital investment and high operating costs.

SUMMARY OF THE INVENTION

The invention is directed to a method and apparatus in which the heated cooling gas to be recooled would contain only a part of the total heat amount recovered during the coke cooling process, and the time rate of the cooling gas circulation would be minimized.

In accordance with the invention the method of cooling hot bulk material such as coke comprises directing the cooling gas in heat exchange relationship with the bulk material and contacting the cooling gas and the bulk material with a water vaporizing heat exchange surface to remove a part of the heat content of the bulk material, and thereafter treating the cooling gases which are heated by the bulk material and directing them after contact to an additional water vaporizing heat exchange surface to cool the contacted gases for reuse.

For cooling the bulk material a maximum fo $5 \times 10^{-5}$ standard cube meters of cooling gas per metric ton of bulk material and thermal unit (kcal) is passed through the material layer. Because of the high thermal capacity and vaporization heat of water as compared to the thermal capacity of gases, the heat can be removed from the hot bulk material by means of equipment considerably smaller in size.

Prior art cooling chambers comprise an upper antechamber section with a charging lock, and a subjacent cooling section with a discharging lock, with the gas evacuation being provided between the antechamber section and the cooling section and the gas supply being provided in the lower zone of the cooling section. Now, in accordance with the invention, the cooling section is developed by providing water supplied heat exchange surfaces in the upper zone of the cooling section.

In the prior art cooling chamber for coke, the provided antechamber filled with incandescent coke serves as a heat accumulator, so that in spite of a discontinuous charging of the hot bulk material, and, consequently, a correspondingly varying instantaneous rate of heat supply into the antechamber, the material passes into the cooling section of the cooling chamber in uniform amounts per unit time and with a uniform temperature with the additional possibility that residual volatile matter still may escape from the coke. Surprisingly, it has been found that water supplied heat exchange surfaces provided in the antechamber section of the cooling chamber are extraordinarily advantageous for the heat removal, without entailing disadvantages, especially such affecting the heat transfer rate and temperature constancy of the removed hot cooling gas.

It is advisable to provide the heat exchange surfaces on the refractory wall of the chamber; they may be embodied, for example, as an array of parallel vertical tubes, which are supplied with water through a common conduit below, and discharged above into a collecting line.

In a particularly advantageous design, it is provided that the shell of the antechamber section and/or of the upper zone of the cooling section are designed as water supplied heat exchange surfaces. The volume of the cooling chamber may then be reduced, particularly because of the reduction resulting therefrom of the required specific thruput of cooling gas.

It has further been found that, surprisingly, the heat amount to be recovered in the separate heat exchanger of the gas cooling circuit by recooling the gas, and thus the amount of circulating cooling gas, can substantially be reduced by accommodating further structures within the cooling chamber, namely by providing that in the upper zone of the cooling section, bulk material free empty spaces are provided which are bounded by cage-like, water conducting structures through which the cooling gas coming from the bulk material passes into the empty space, and that the head zones of the cage-like structures are covered by upwardly closed hood parts collecting and removing the cooling gas.

Advantageously, the head zones of the cage-like structures are roofed by a hood part closed upwardly and collecting and evacuating the cooling gas. While the water supplied heat exchange surfaces at the cooling chamber wall are very efficient in transferring heat by convection and radiation from the contacting bulk material, they clearly remove less heat from the cooling gas. However, the cage-like structures surrounding the empty spaces are particularly effective in this regard.

Accordingly it is an object of the invention to provide a method of cooling hot bulk material such as coke which comprises directing a cooling gas in heat exchange relationship with the bulk material, contacting the cooling gas and the bulk material with a water vaporizing heat exchange surface to remove a part of the heat content of the bulk material and the cooling gases which are heated up by the bulk material and directing the cooling gases after contact to an additional water vaporizing heat exchanger surface to cool the contacted gases for reuse and wherein the additional heat exchange surfaces are not contacted by the bulk material.

A further object of the invention is to provide a cooling reactor for cooling hot coke material such as coke which comprises a vertically elongated vessel defining a cooling chamber having a top charging inlet for the bulk material and a bottom charged discharge for the cooled bulk material, and including means for directing cooling gases into the chamber adjacent the lower end thereof for flow upwardly in the chamber and with further means which define a water supply heat exchanger surface in the chamber adjacent the upper portion thereof further a collecting duct connected to the chamber adjacent the upper end thereof for the outflow of the cooled gases.

A further object of the invention is to provide an apparatus for cooling bulk material such as coke which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 5 is an end elevational view of a heat exchanger unit employed with the reactor vessel; and FIG. 6 is a side elevational view of the heat exchanger unit shown in FIG. 5.

DESCRIPTION OF THE PREFERRED EMBODIMENT

Figure 1:
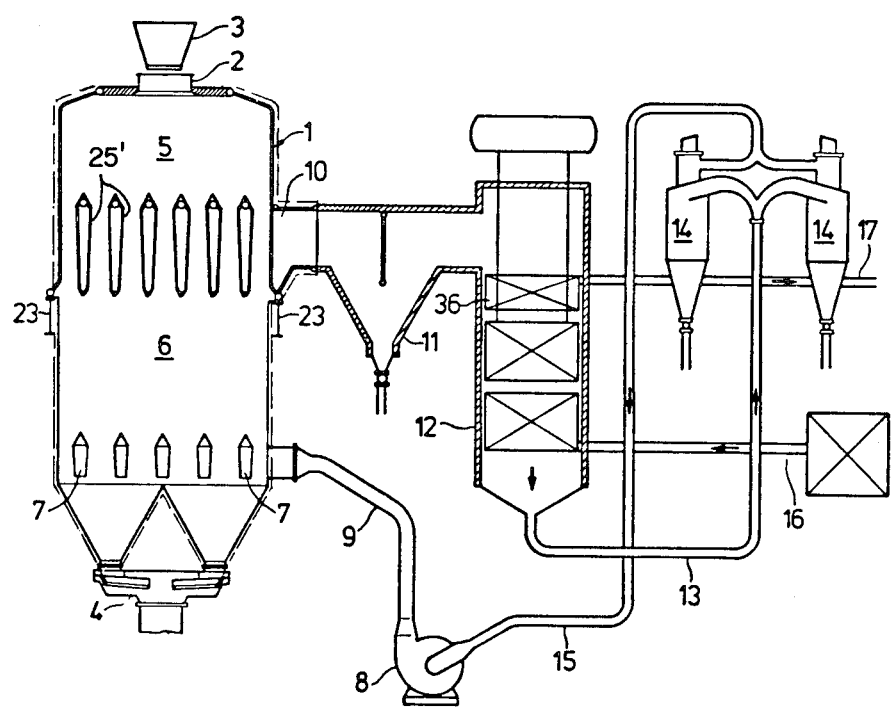
FIG. 1 is a schematic layout of a coke cooling system constructed in accordance with the invention.

Referring to the drawings in particular the invention therein, comprises an apparatus and method for cooling hot bulk material such as coke which is provided in charge buckets 3 which are directed into a charge lock 2 of a reaction vessel defining a cooling chamber generally designated 1 as shown in FIG. 1. The bulk material moves in heat exchange relationship with a gas which is directed by a blower 8 through a supply conduit 9 and nozzle 7 upwardly into the chamber of the reaction vessel 1 through a lower cooling section 6 and into an upper chamber section 5. The cooling chamber includes a heat exchange surface which in the embodiment shown comprises a heat exchanger system in the form of a ring conduit 21 supplying water to upright tubes 20 in the wall of the reactor vessel which lead to a steam collecting pipe 22 at the upper end thereof. In addition or alternatively the heat exchanger surfaces comprise individual heat exchange units 25' which are disposed in spaced relationship across the width of the reactor vessel 1 intermediate the height of the vessel. The cooling gases which flow upwardly in the cooling chamber of the vessel 1 contact the bulk material to cause the heating up of the cooling gases and both the cooling gases and the bulk material are also cooled by water vaporizing heat exchange surfaces to remove a part of the heat content of the bulk material and the cooling gases. Thereafter the cooling gases are directed through a collecting duct 10 connected into the vessel intermediate its height in the vicinity of the heat exchange unit 25'. The cooling gases are then directed to an additional water vaporizing heat exchange surface which comprises a recooling heat exchanger or waste heat boiler 12.

The cooling plant includes a cooling chamber 1, into which the hot bulk material is periodically, intermittently, charged by a bucket 3 and through a charging lock 2. Having passed vertically through chamber 1, the cooled material is removed through a discharge lock 4. The cooling chamber comprises an upper antechamber section 5 and a lower cooling section 6 into which, from a line 9 below and through a plurality of nozzles 7, a circulating inert cool cooling gas is driven by a blower 8. As a rule, the gas is composed of about 84% of nitrogen and about 14% of carbon monoxide with the balance being mainly hydrogen and oxygen. The cooling gas heats up countercurrently at the coke, is evacuated at the top of cooling section 6 of cooling chamber 1, and directed through a collecting duct 10 (FIG. 3) forking the chamber to a preliminary dust separator 11, whereupon it is supplied to a recooling heat exchanger 12 (waste heat boiler). The recooled gas is directed through a line 13 to dust separating cyclones 14 and therefrom returned through a line 15 to blower 8. Recooling heat exchanger 12 is supplied with water (line 16) and, by taking up heat, generates high-pressure steam (line 17) for driving steam turbines, for example. Usually, the cooling plant has various additional parts of equipment, such as a dust exhauster in antechamber section 5 and/or charging lock 2, and a device for cleaning the cooling gas, which are not shown for reasons of clarity.

Figure 2:
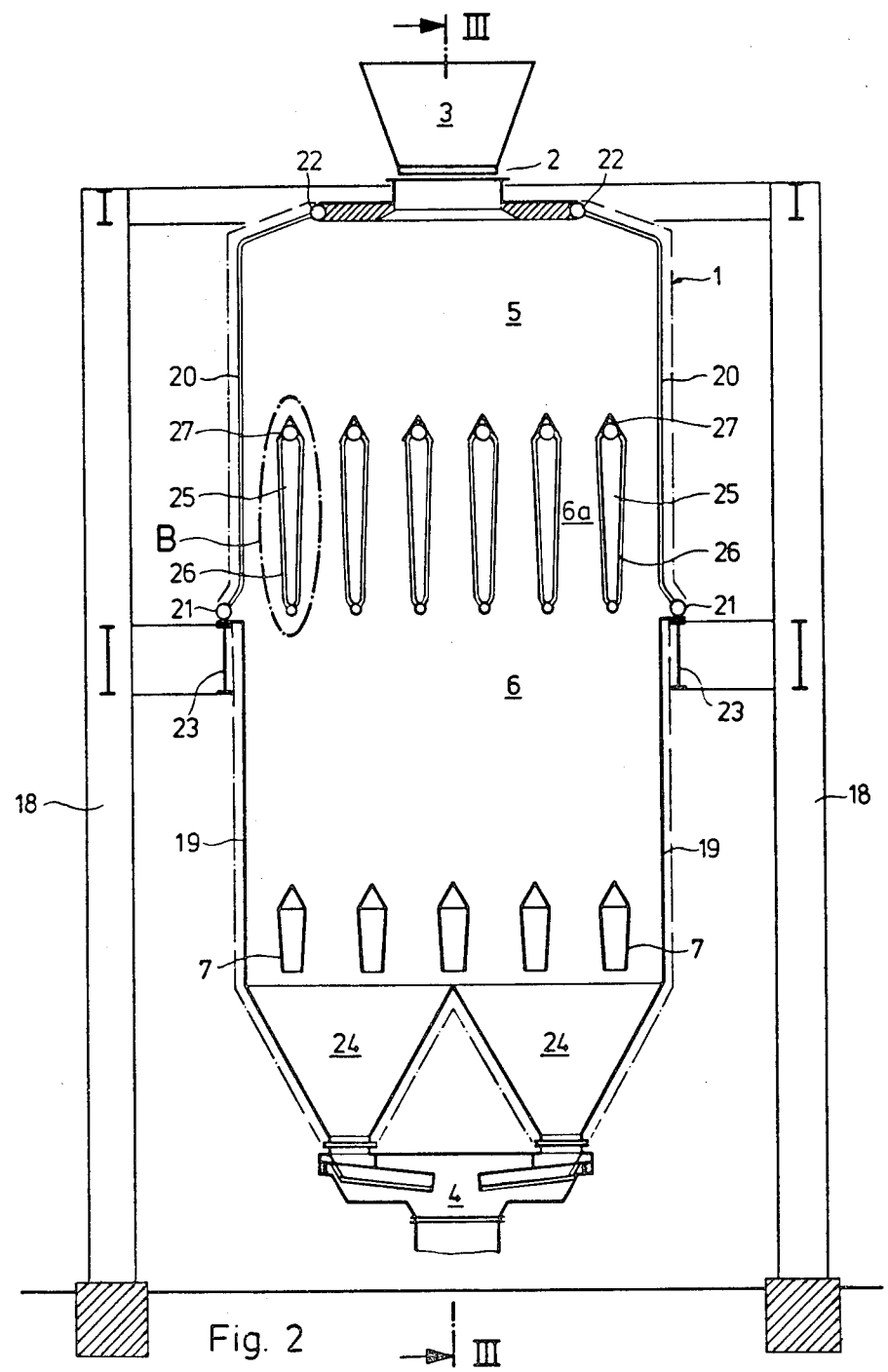
FIG. 2 is an enlarged detail of the reactor vessel shown in FIG. 1.
Figure 3:
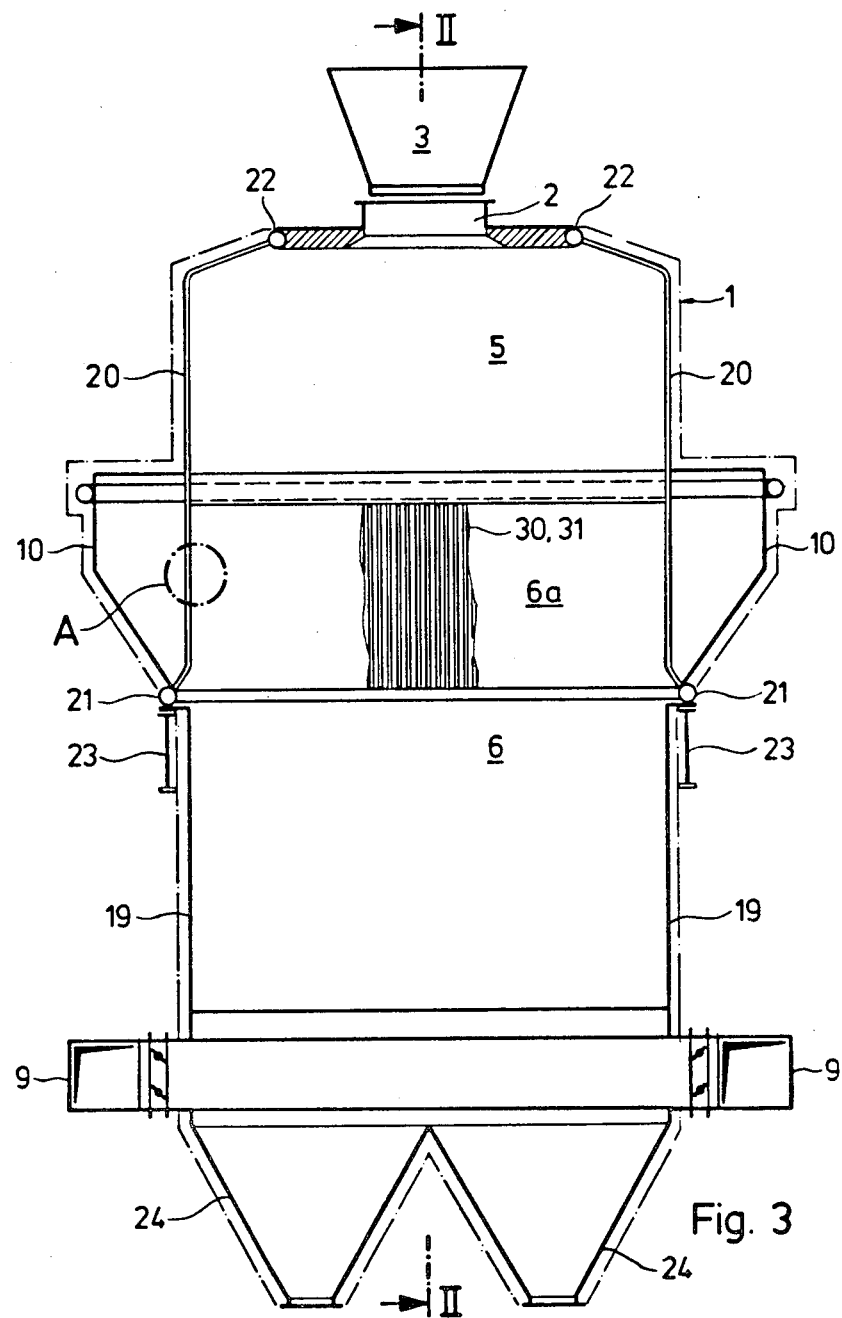
FIG. 3 is a section taken along the line III—III of FIG. 2.

Details of vertical cooling chamber 1 are shown in FIGS. 2 and 3. Cooling chamber 1 comprises a steel shell 19 supported by a steel structure 18 on a foundation, and is designed, in the zones of antechamber section 5 and upper zone 6a of cooling section 6, as a water conducting heat exchanger 20. The exchanger may be assembled of closely adjacent, so called webbed tubes, welded to one another by short webs. Heat exchanger 20 is supplied with water through a ring pipe 21 and discharges through an upper steam-water ring pipe 22 which leads (not shown) to a steam drum 36 of the recooling heat exchanger 12 (waste heat boiler). Below supporting beams 23 of steel structure 18 bearing against the foundation, cooling section 6 of chamber 1 extends downwardly as a single-walled steel shell 19 and is provided at its bottom with four supporting hoppers 24 whose lower outlets open into discharge lock 4. The dash dotted lines around chamber 1 indicate an outer envelope of the chamber, of rock wool covered with steel sheets, for example, for heat insulation and contact safety.

In the upper zone 6a of cooling section 6, cage-like water conducting structures 26 are provided enclosing empty spaces 25 into which the bulk material cannot penetrate and roofed by a solid hood part 27. The individual cage-like structures are arranged in parallel to one another and formed each by a lower horizontal water supply pipe 28 which is connected to ring pipe 21, and an upper horizontal steam and water discharging pipe 29, and by two rows of cooling tubes 30,31 which extend approximately vertically and connect the two pipes 28, 29 (FIGS. 3,5,6). Team and water discharging pipes 29 are then united and lead (not shown), along with upper ring pipe 22, into steam drum 36 of recooling heat exchanger 12 (waste heat boiler). The individual hood parts 27 are united by the cooling gas collecting duct 10. The spacing of the rows of cooling tubes 30 and 31 enclosing space 25 increases upwardly. The cooling tubes of either row are spaced from each other so as to leave gaps which are narrower than the minimum grain size of the bulk material. The gaps are bridged by spacer members 32 to 34, connecting the cooling tubes, as shown in FIGS. 5 and 6. The lower spacer members 32 are designed as flat metal strips, which are close to each other but spaced sufficiently to allow fine abraded material which might have passed into space 25, to easily fall out. Some of the middle spacer members 33 and upper members 34 have a projecting leg portion tapering upwardly and rearwardly. These spacer members therefore project from a plane formed by the row of cooling tubes toward the charged bulk material, so that tubes 30, 31 are less exposed to abrasion, and the risk of material lumps caking upon the tubes is avoided. Due to this shaping and unequal spacing of spacer members 32-34, the cooling gas passing into the respective space 25 encounters a resistance to flow diminishing upwardly, whereby the upwardly dropping pressure and increasing volume of the cooling gas, caused by the slightly upwardly enlarging volume of the space, is compensated and altogether a gas flow favorable for the cooling is obtained.

Figure 4:
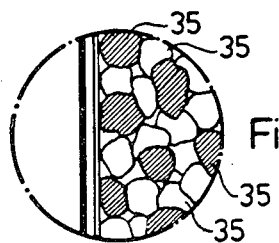
FIG. 4 is an enlarged detail of a portion of the vessel as shown in FIG. 3 designated by the A.

The coarsely grained or lump material migrating downwardly in cooling chamber 1 forms a discontinuous outer boundary surface (see FIG. 4, material pieces 35) and applies against the respective surface portions of heat exchanger 20 and cooling tubes 30, 31 or spacer members 32 to 34, by numerous contact areas, so that a corresponding heat amount is removed from the material directly, by convection and radiation, already in antechamber section 5. The cooling gas countercurrently introduced through nozzles 7 transfers a portion of its heat content taken up from the charged material to the same water vaporizing surfaces 20, 30–34, except for those which are located in upper chamber section 5. Prior to leaving cooling chamber 1 through hood parts 27, collecting duct 10, and dust separator 11, to be directed to recooling heat exchanger 12. The cooling gas transfers another portion of its heat content to cooling tubes 30 and 31 from the inside of spaces 25, through the surface areas which are not in contact with the charged material.

Taking an example of a cooling plant, incandescent coke having a temperature of approximately 1000° to 1050° C. is charged periodically in amounts of one bucket 3 per about 10 minutes into an antechamber section 5 capable of receiving about 12 to 15 bucket contents. A considerable heat amount is recovered already through water conducting heat exchangers 20, particularly also due to heat radiation. At discharge lock 4, the coke cooled down to about 180° C., for example, can continuously be removed. With the corresponding coke thruput rate of 60 metric tons per hour, the required cooling gas circulation is about 60000 to 70000 standard cube meters per hour.

Instead of cooling hot coke, other granular hot bulk materials, such as calcined ores, sinter cakes, lime, magnesite, dolomite, clinker material, may be treated in the inventive way.

While a specific embodiment of the invention has been shown and described in detail to illustrate the application of the principles of the invention, it will be understood that the invention may be embodied otherwise without departing from such principles.

The embodiment of the invention is which an exclusive property or privilege is claimed is as follows:

1. A cooling reactor for cooling hot bulk material such as coke, comprising a vertically elongated vessel defining a cooling chamber having a top charging inlet for bulk material and a bottom charge discharge for the cool bulk material, means for directing cooling gases into said chamber adjacent the lower end thereof for flow upwardly in said chamber, means defining a water supply heat exchanger surface in said chamber adjacent the upper end thereof, and a collecting duct connected into said chamber intermediate the height thereof for the outflow of the gases which have passed over said heat exchanger surface, said means defining a water supply heat exchanger surface comprising a plurality of heat exchanger units spaced across said reactor vessel each having a top roof-like hood portion with downwardly and outwardly flaring roof-like walls for deflecting the bulk material therebetween.

2. A cooling reactor according to claim 1, wherein said means defining a water supply heat exchanger surface comprises a plurality of tubes in the walls of the upper portion of said vessel.

3. A cooling reactor according to claim 1, wherein said vessel includes a refractory wall with said tubes being embedded in said wall.

4. A cooling reactor according to claim 1, wherein said means defining a water supply heat exchanger surface comprises an inlet ring header extending around the walls of said vessel intermediate the height thereof by a plurality of vertically extending tubes connected from said header upwardly along the walls of said reactor to the top thereof and a top ring steam pipe header connected to said vertical tubes.

5. A cooling reactor according to claim 1, wherein the upper portion of said walls has a plurality of tubes therein comprising said means defining a water supply heat exchanger surface.

6. A cooling reactor according to claim 1, wherein said individual heat exchanger units define cage-like structures enclosing an empty space therebetween including a lower horizontal inlet header pipe with an upper horizontal steam and water discharge pipe interconnected by tubes on each side which extends substantially vertically.

7. A cooling reactor according to claim 6, wherein the distance between rows of the vertical cooling tubes increases in an upward direction, said rows of cooling tubes on each side of said headers forming an empty space therebetween.

8. A cooling reactor according to claim 6, wherein said vertical cooling tubes are spaced from each other by distances which are less than the smallest grain size of the bulk material.

9. A cooling reactor according to claim 7, including spacer members arranged between the tubes of each of the rows on each side of said heat exchanger units, said spacer members being shaped so that their resistance to cooling gas flow decreases in an upward direction.

10. A cooling reactor according to claim 5, wherein said individual heat exchange units each comprise a bottom inlet header and a top outlet header spaced from said vertically above said bottom inlet header with a row of vertical tubes on each side of said bottom and top inlet headers arranged in spaced location to each other including spacer members between said tubes in each row shaped to project outwardly beyond the plane of said tubes to deflect the bulk material away therefrom.

11. A cooling reactor for cooling hot bulk material such as coke, comprising:
   a vertically elongated vessel defining a cooling chamber having an upper antechamber section with a charge lock for receiving hot bulk material, and a lower cooling section having a discharge lock for discharging bulk material;
   gas supply means for supplying cooling gas connected to a lower end of said lower cooling section;
   gas take-off means connected to an upper end of said lower cooling section so that cooling gas enters into said cooling chamber at a lower end thereof and travels upwardly to an upper end of said lower cooling section to said gas take-off means;
   a closed cooling gas circuit having a recooling heat exchanger and connected to said gas supply means and to said gas take-off means to supply recooled cooling gas to said vessel; and
   a plurality of water supply heat exchangers disposed in the upper end of said lower cooling section and spaced from each other, each of said water supply heat exchangers having an exterior heat exchange surface for contacting bulk material and cooling gas in said cooling chamber and an interior surface out of contact with bulk material and for contact with cooling water.

12. A cooling reactor according to claim 11, wherein each of said water supply heat exchangers defines a free space from which bulk material is excluded, each water supply heat exchanger having a cage-like water conducting barrier defining said free space through which cooling gas can pass and into which cooling water can be supplied, said gas take-off means including a hood covering each of said cage-like water conducting barriers for collecting cooling gas.

13. A cooling reactor according to claim 12, wherein said spaces extend parallel to each other, a lower horizontal pipe connected to each cage-like water conductor barrier for supplying water thereto and an upper horizontal pipe connected to each cage-like water conducting barrier for removing water therefrom, each cage-like cooling conducting barrier comprising a pair of substantially vertical rows of cooling pipes connected between said lower and upper horizontal pipes.

14. A cooling reactor according to claim 13, wherein said recooling heat exchanger is connected between said gas take-off means and said gas supply means at a location spaced from said cooling chamber for recooling cooling gas supplied through said cooling chamber, said upper horizontal pipe connected to said recooling heat exchanger for cooling water from said cage-like water conducting barriers.

15. A cooling reactor according to claim 14, wherein each of said spaces increases in width in a direction upwardly in said cooling chamber.

16. A cooling reactor according to claim 14, including a plurality of vertically spaced spacers connected to each cooling pipe in each row for holding said cooling pipes of each row at a selected spaced location with respect to each other, a spacing between said spacers and said cooling pipes in each row being smaller than the smallest grain size of the bulk material.

17. A cooling reactor according to claim 15, including a plurality of vertically spaced spacers connected to each cooling pipe in each row for holding said cooling pipes of each row at a selected spaced location with respect to each other, a spacing between said spacers and said cooling pipes in each row being smaller than the smallest grain size of the bulk material.

18. A cooling reactor according to claim 17, wherein said spacers are positioned or structured so as to present diminished resistance to cooling gas in a direction upwardly in said cooling chamber.

19. A cooling reactor according to claim 17, wherein each row of cooling pipes is contained in a plane, each of said spacers projecting beyond said plane.

20. A method of cooling hot bulk material such as coke which can be supplied intermittently, in a vertical cooling chamber for receiving a charge of hot bulk material and using a cooling gas circulating in a closed loop extending into a gas inlet of the cooling chamber, through the charge in the cooling chamber and out a gas outlet of the cooling chamber, comprising:
   circulating the cooling gas through the charge to partly cool the charge and heat the cooling gas;
   recooling the heated cooling gas in a recooling heat exchanger of the closed loop at a location spaced from the cooling chamber;
   contacting the charge and the cooling gas in the cooling chamber with a plurality of heat exchange units disposed in the cooling chamber between the gas inlet and the gas outlet and within the charge, each unit having an inner heat exchange surface which is out of contact with the charge for receiving water to be vaporized, and an exterior surface for contacting the charge and the cooling gas in the cooling chamber; and supplying water to the interior heat exchange surfaces of the heat exchange units for further cooling the charge and the cooling gas in the cooling chamber before the cooling gas leaves the cooling chamber through the gas outlet.

21. A method according to claim 20 wherein for cooling the bulk material charge a maximum of $5 \times 10^{-5}$ standard cube meters of cooling gas per metric ton of bulk material and thermal unit kcal is passed through the charge.

* * * * *